United States Patent
Kumagai et al.

(10) Patent No.: US 6,628,369 B2
(45) Date of Patent: Sep. 30, 2003

(54) CIRCULAR POLARIZER AND LIQUID CRYSTAL DISPLAY

(75) Inventors: Yoshihiro Kumagai, Yokohama (JP); Suzushi Nishimura, Yokohama (JP); Tetsuya Uesaka, Yokohama (JP); Takehiro Toyooka, Yokohama (JP)

(73) Assignee: Nippon Oil Corporation, Yokohama (JP)

( * ) Notice: Subject to any disclaimer, the term of this patent is extended or adjusted under 35 U.S.C. 154(b) by 0 days.

(21) Appl. No.: 10/304,357

(22) Filed: Nov. 25, 2002

(65) Prior Publication Data

US 2003/0090619 A1 May 15, 2003

Related U.S. Application Data

(63) Continuation of application No. PCT/JP01/03925, filed on Nov. 5, 2001.

(30) Foreign Application Priority Data

Mar. 10, 2000 (JP) ........................................ 2000-303451
May 23, 2000 (JP) ........................................ 2000-151929

(51) Int. Cl.$^7$ .......................................... G02F 1/1335
(52) U.S. Cl. ........................ 349/194; 349/194; 349/98; 349/96; 349/117
(58) Field of Search ........................... 349/194, 96, 98, 349/162, 117, 113

(56) References Cited

U.S. PATENT DOCUMENTS

| | | | | |
|---|---|---|---|---|
| 5,105,289 A | * | 4/1992 | Sonehara et al. | 359/70 |
| 6,008,871 A | * | 12/1999 | Okumura | 349/61 |
| 6,067,136 A | | 5/2000 | Yamaguchi et al. | |
| 6,118,507 A | * | 9/2000 | Shigeno et al. | 349/113 |
| 6,295,113 B1 | * | 9/2001 | Yang | 349/179 |
| 2001/0033353 A1 | * | 10/2001 | Shimoshikiryo | 349/129 |
| 2002/0063826 A1 | * | 5/2002 | Okamoto et al. | 349/117 |

FOREIGN PATENT DOCUMENTS

| | | |
|---|---|---|
| JP | 07-005457 | 1/1995 |
| JP | 08-292413 | 11/1996 |
| JP | 09-292519 | 11/1997 |
| JP | 10-206846 | 8/1998 |
| JP | 11-153791 | 6/1999 |
| JP | 11-231304 | 8/1999 |
| JP | 2000-131680 | 5/2000 |
| JP | 2001-042317 | 2/2001 |
| JP | 2001-075099 | 3/2001 |
| JP | 2001-108957 | 4/2001 |
| JP | 2001-125105 | 5/2001 |
| JP | 2001-183651 | 7/2001 |
| WO | WO99/40480 | 8/1999 |

\* cited by examiner

Primary Examiner—Toan Ton
Assistant Examiner—Mike Qi
(74) Attorney, Agent, or Firm—Akin, Gump, Strauss, Hauer & Feld, L.L.P.

(57) ABSTRACT

A transflective liquid crystal display providing a bright displayed image of high contrast in the transmission mode with less dependence on the viewing angle by combining a polarizer with an optically anisotropic element having a liquid crystal film in which a twisted nematic alignment stricture is secured to produce a circular polarizer and disposing the circular polarizer on the rear side of a transflector in the transflective liquid crystal display.

6 Claims, 1 Drawing Sheet

000
CIRCULAR POLARIZER AND LIQUID CRYSTAL DISPLAY

CROSS-REFERENCE TO RELATED APPLICATIONS

This application is a continuation of International Application No. PCT/JP01/03925, filed Nov. 5, 2001, the disclosure of which is incorporated herein by reference.

BACKGROUND OF THE INVENTION

This invention relates to circular polarization plates and liquid crystal displays provided with same.

In recent years, a liquid crystal display has been highly expected to expand its market of the displays for personal digital assistants (PDA) where its thin and light characteristics can be fully utilized. Since such personal digital assistants (PDA) are generally driven with batteries, it has been necessary to keep the electricity to be consumed as low as possible. Therefore, an attention has been made particularly on reflective type liquid crystal displays for the personal digital assistants which are free of or need not use all the time an electricity-consuming back light and can be reduced in electricity consumption, thickness, and weight.

There have been widely used reflective type liquid crystal displays with two polarizers for black-and-white displaying in which a liquid crystal cell is sandwiched between a pair of polarizers and a reflector is disposed the outside of one of the polarizer. Furthermore, a reflective type liquid crystal display with a single polarizer in which a liquid crystal layer is sandwiched between a polarizer and a reflector has been proposed and practically used because it is brighter in principle than those with two polarizers and is easy to be colored as reported in JAPAN DISPLAY, 192 (1989) by T. Sonehara et al. However, these reflective type liquid crystal displays have a drawback that the displayed images become invisible when they are used in a dark place because they usually display the images using light from the outside of the displays.

To solve this problem, there has been proposed a transflective liquid crystal display with a single polarizer in which a transflector having characteristics that part of an incident light is allowed to transmit is used instead of the reflector and a back light, is provided, as described in Japanese Patent Laid Open Publication No. 10-206846. Therefore, this display can be used as a reflective type, i.e., reflection mode using light from the outside when the back light is not turned on and as a transmission type, i.e., transmission mode using the back light under the dark situations.

The transflective liquid crystal display with a single polarizer needs to make an incident of substantially circularly polarized light to the liquid crystal cell through the transflector in the transmission mode. Therefore, it is necessary to dispose a circular polarizer comprising one or a plurality of polymeric stretched films typically polycarbonates and a polarizer between the transflector and the back light. However, such a circular polarizer having polymeric stretched films has a problem that it is low in contrast and narrow in the viewing angle in the transmission mode. Furthermore, it has a problem that it is difficult to make the circular polarizer thin due to the thickness of the polymeric oriented film, i.e., 60 to 100 μm, resulting in the increase of total thickness of the liquid crystal display.

BRIEF SUMMARY OF THE INVENTION

The object of the present invention is to provide a circular polarizer which has excellent circular polarization properties and can be designed to be thin and a liquid crystal display which is bright in the transmission mode, high in contrast, and less dependence on the viewing angle.

That is, the present invention relates to a circular polarizer comprising at least a polarizer and an optical anisotropic element wherein the optical anisotropic element contains a liquid crystal film in which a twisted nematic alignment structure is fixed.

The present invention also relates to the circular polarizer in which the product of the birefringence Δn at a wavelength of 550 nm and thickness d (nm), of the liquid crystal film is set to be within the range of 140 nm or greater and 400 nm or less and the twisted nematic angle thereof is set to be within the range of 30 degrees or larger and 85 degrees or smaller.

The present invention also relates to the circular polarizer in which the combination of the product of the birefringence Δn at a wavelength of 550 nm and thickness d (nm) of the liquid crystal film and the twisted angle is set to satisfy any of the following conditions:

(1) 155 nm or greater and 175 nm or less and 40 degrees or larger and 50 degrees or smaller;

(2) 176 nm or greater and 216 nm or less and 58 degrees or larger and 70 degrees or smaller; and (3) 230 nm or greater and 270 nm or less and 70 degrees or larger and 80 degrees or smaller.

The present invention also relates to the circular polarizer whose liquid crystal film is one obtained by aligning a liquid crystalline material in a liquid crystalline state so as to assume a twisted nematic phase and cooling the material as it is so as to fix the twisted nematic orientation in a glassy state.

The present invention also relates to the circular polarizer whose liquid crystal film is one obtained by aligning a liquid crystalline material in a liquid crystalline state so as to assume a twisted nematic phase and then photo- or thermal-crosslinking the material so as to fix the twisted nematic orientation.

The present invention relates to the circular polarizer which has at least a polarizer and an optical anisotropic element laminated one after another and a thickness of 300 μm or less.

Furthermore, the present invention relates to a liquid crystal display having the aforementioned circular polarizer.

The present invention also relates to a transflective liquid crystal display which comprises at least a liquid crystal cell formed by sandwiching a liquid crystal layer between a pair of transparent substrates each provided with an electrode, a polarizer disposed on the viewer's side of the cell, at least one optical retardation compensator disposed between the polarizer and the cell, and a transflector disposed in the rear viewing from the observer, of the liquid crystal layer wherein the aforementioned circular polarizer is provided in the rear viewing from the observer, of the transflector.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

The circular polarizer is comprised of at least a polarizer and an optical anisotropic element. Although there may be used a plurality of optical anisotropic elements, sufficient optical characteristics can be obtained with the single use of the element.

No particular limitation is imposed on the polarizer as long as the objects of the present invention can be achieved. Therefore, there may be properly used conventional ones generally used in a liquid crystal display. Specific examples are PVA-based polarizing films such as polyvinyl alcohol (PVA) and partial acetal PVA and polarizing films such as those obtained by stretching a hydrophilic polymeric film comprising a partially saponified product of an ehtylene-vinyl acetate copolymer and absorbing iodine and/or dichroic dye and those comprising a polyene-oriented film such as a dehydrated product of PVA and a dechlorinated product of polyvinyl chloride. Alternatively, there may be used reflection type polarizers.

These polarizers may be used independently or in combination with a transparent protective layer provided on one or both surfaces of the polarizer for the purpose of enhancing the strength, moisture resistance, and heat resistance. Examples of the protective layer are those formed by laminating a transparent plastic film such as polyester and triacetyl cellulose directly or via an adhesive layer on the polarizer; coated layers of resin; and acrylic- or epoxy-based photo-setting type resin layers. When the protective layers are coated on both surfaces of the polarizing film, they may be the same or different.

The optical anisotropic element is an element comprising at least a liquid crystal film wherein a twisted nematic alignment is fixed and generating a phase difference with a wavelength of about $(2n+1)/4$ (wherein n=0, 1, 2, ... ) in the region of visible rays, i.e., acting to convert linearly polarized light to substantially circularly polarized light. Amongst, preferred optical anisotropic elements generating a phase difference with about $(2n+1)/4$ wavelength are those generating a phase difference with about $(2n+1)/4$ wherein n=0 or 1 wavelength, i.e., about ¼ or ¾ wavelength phase difference because they have excellent circular polarization characteristics.

Although the liquid crystal film alone can be used as the optical anisotropic element, one or both surfaces of the film may be covered with a transparent protective layer for the purpose of enhancing the strength and resistance. Examples of the protective layer are those obtained by laminating a transparent plastic film such as polyester and triacetyl cellulose directly or via an adhesive layer on the polarizer; coated layers of resin; and acrylic- or epoxy-based photo-setting type resin layers. When the protective layers are coated on both surfaces of the polarizing film, they may be the same or different. Alternatively, the liquid crystal film may be formed directly on the polarizer and then may be used as the circular polarizer as it is. For example, a liquid crystal film is laminated over a transparent plastic film such as polyester and triacetyl cellulose and then integrated with a polarizing film thereby obtaining a circular polarizer with a structure of a polarizing film/a transparent plastic film/a liquid crystal/a transparent plastic film.

The liquid crystal film essential for the optical anisotropic element used in the present invention is a liquid crystal film in which a twisted nematic alignment structure with optical anisotropic axes twisted from one surface to the other of the film is fixed. This liquid crystal film has characteristics equivalent to those of one obtained by laminating a plurality of layers having optical anisotropy such that their optically anisotropic axes are continuously twisted and has a retardation ($\Delta nd$: the value represented by the product of birefringence $\Delta n$ and thickness d) and a twisted angle, just like normal TN(Twisted Nematic) or STN(Super Twisted Nematic) liquid crystal cells. "Fixing the alignment structure" denotes that the alignment structure is maintained without being disordered under the conditions where a liquid crystal film is normally used. The twisted nematic aligned structure can be formed in the liquid crystal cell as well. However, the alignment structure of the liquid crystal film can be fixed without using substrate such as a glass sheet by fixing the alignment structure in the liquid crystal film thereby making the resulting liquid crystal display lighter, thinner, and easier to handle. As the above-described liquid crystal film, there may be preferably used a temperature compensation type film whose retardation changes with the change of the surrounding temperature and returns when the surrounding temperature returns as it was before.

In the present invention, it is desirous to use a liquid crystal film in which the product ($\Delta nd$) of the birefringence $\Delta n$ at a wavelength of 550 nm and thickness d (nm) is 140 nm or greater and 400 nm or lower and the twisted angle is 30 degrees or larger and 85 degrees or smaller with the objective of circular polarization characteristics. Furthermore, a liquid crystal film satisfying any of the following conditions is particularly preferred because it exhibits excellent circular polarization characteristics in combination with the above-described polarizer:

(1) $\Delta nd$ is 155 nm or greater and 175 nm or less and the twisted angle is 40 degrees or larger and 50 degrees or smaller;

(2) $\Delta nd$ is 176 nm or greater and 216 nm or less and the twisted angle is 58 degrees or larger and 70 degrees or smaller; and (3) $\Delta nd$ is 230 nm or greater and 270 nm or less and the twisted angle is 70 degrees or larger and 80 degrees or smaller.

The twist direction of the film is in two ways but may be either right-handed or left-handed.

The liquid crystal film may be obtained by aligning a liquid crystalline material exhibiting nematic liquid crystallinity to be twisted nematic and fixing the alignment structure by photo- or thermal-crosslinking or cooling depending on the various physical properties of the material.

No particular limitation is imposed on the type of the liquid crystalline material as long as it exhibits nematic liquid crystallinity. Therefore, various low molecular weight liquid crystalline substances, polymeric liquid crystalline substances, and mixtures thereof can be used in the present invention. It does not matter whether the molecular shape of the liquid crystalline material is like bar or disc. Therefore, there may be used discotic liquid crystalline materials exhibiting discotic liquid crystallinity. In the case of using a mixture of these materials, no particular limitation is imposed on the composition and ratio of the materials as long as the desired twisted nematic alignment structure can be formed with these materials and can be fixed. For example, there may be used a mixture comprising one or a plurality of types of low molecular weight- and/or polymeric- liquid crystalline substances and one or a plurality of types of low molecular weight- and/or polymeric-non-liquid crystalline substances or various additives.

Examples of the low molecular weight liquid crystalline substance are those having Schiff base-, biphenyl-, terphenyl-, ester-, thioester-, stillbene-, tolan-, azoxy-, azo-, phenyl cyclohexane-, trimesic acid-, triphenylene-, torquecene-, phthalocyanine-, or porphrin-molecular chain and mixtures thereof.

Eligible polymeric liquid crystalline substances are various main chain type- and side chain type-polymeric liquid crystalline substances and mixtures thereof. Examples of the main chain type polymeric liquid crystalline substance are polyester-, polyamide-, polycarbonate-, polyimide-, polyurethane-, polybenzoimidazole-, polybenzoxazole-, polybenzothiazole-, polyazomethine-, polyesteramide-, polyestercarbonate-, and polyesterimide-based polymeric liquid crystalline substance. Among these, particularly preferred are semi-aromatic polyester-based liquid crystalline polymers wherein mesogen providing liquid crystallinity is alternately bonded to a flexible chain, such as polymethylene, polyethyleneoxide, and polysiloxane and wholly aromatic polyester-based liquid crystals which are free of flexible chain.

Examples of the side chain type polymeric liquid crystalline substances are those having a straight- or cyclic-main chain and a mesogen at each side, such as polyacrylate-, polymethacrylate, polyvinyl-, polysiloxane-, polyether-, polymalonate-, and polyester-based liquid crystals and mixtures thereof. Among these, particularly preferred are those wherein a mesogen providing liquid crystallinity is bonded to the main-chain via a spacer comprised of a flexible chain and those having a molecular structure wherein the main chain and the side chain both have a mesogen.

The liquid crystalline material is preferably blended with a chiral dopant or various liquid crystalline materials or non-liquid crystalline materials having at least one chiral structural unit.

As the chiral structural unit, there may be used units derived from optically active 2-methyl-1,4-butanediol, 2,4-pentanediol, 1,2-propanediol, 2-chloro-1,4-butanediol, 2-fluoro-1,4-butanediol, 2-bromo-1,4-butanediol, 2-ethyl-1,4-butanediol, 2-propyl-1,4-butanediol, 3-methylhexanediol, 3-methyl adipic acid, naproxen derivative, camphoric acid, binaphthol, menthol, or a compound having a cholesteryl group-containing structural unit or derivatives thereof. The chiral structural unit may be R-form or S-form or a mixture thereof. These structural units are merely examples and thus the present invention is not limited thereto.

In the case of fixing the alignment structure formed in a liquid crystalline state by photo- or thermal crosslinking during the preparation of the liquid crystal film, the liquid crystalline material is desirously blended with various liquid crystalline substances having functional groups or sites which are reactive by photo- or thermal crosslinking. Examples of such functional groups are epoxy groups such as acryl, methacryl, vinyl, vinyl ether, allyl, allyloxy, and glycidyl groups, isocyanate, thioisocyanate, azo, diazo, azido, hydroxyl, carboxyl, and lower ester groups. Particularly preferred are acryl and methacryl groups. Examples of the crosslinkable site are those containing molecular structures of maleimide, maleic anhydride, cinnamic acid, cinnamate, alkene, diene, allene, alkyne, azo, azoxy, disulfide, or polysulfide. Although these crosslinkable groups or sites may be contained in various liquid crystalline substances constituting the liquid crystal material, a non-liquid crystalline substance containing the crosslinkable groups or sites may be added to the liquid crystalline material.

The circular polarizer used in the present invention comprises the above-described polarizer and optical anisotropic element containing the liquid crystal film. Since this optical anisotropic element contains a liquid crystal film formed using a liquid crystalline material with a large birefringence $\Delta n$ unlike a polymeric stretched film with a small birefringence $\Delta n$, a desired phase difference can be obtained with the liquid crystal film having a small thickness. Therefore, the total thickness of the circular polarizer can be reduced. No particular limitation is imposed on the thickness of the circular polarizer. However, it can be made usually 300 $\mu$m or less, preferably 250 $\mu$m, more preferably 220 $\mu$m, and further more preferably 200 $\mu$m or less.

In addition to the polarizer and the optical anisotropic element, the circular polarizer may contain one or a plularity of protective layers, anti-reflection layers, anti-glare treated layers, hard coat layers, adhesive layers, pressure-sensitive adhesive layers, light diffusing layers, and light-diffusive adhesive layers.

The liquid crystal display of the present invention contains the above-described circular polarizer as an essential component. Generally, a liquid crystal display comprises a polarizer and a liquid crystal cell and if necessary an optical retardation compensator, a reflective layer, a photo diffusing layer, a back light, a front light, a light-controlled film, a light guide plate, a prism sheet or the like. However, no particular limitation is imposed on the structure of the liquid crystal display of the present invention except that the above-described circular polarizer is additionally provided. No particular limitation is imposed on the position of the circular polarizer and it may be arranged on one or a plurality of the potions in the display.

No particular limitation is imposed on the polarizer used in the liquid crystal display. Therefore, it may be the same as the one used in the circular polarizer.

No particular limitation is imposed on the liquid crystal cell. There may be used a conventional liquid crystal cell in which a liquid crystal layer is sandwiched by a pair of transparent substrates each having an electrode.

No particular limitation is imposed on the transparent substrate as long as it aligns the liquid crystalline material forming the liquid crystal layer in a specific direction. Specifically, there may be used either a transparent substrate having properties to align the liquid crystal or a transparent substrate having no such properties but provided with an alignment film or the like having such properties. The electrode for the cell may be conventional ones. Generally, the electrode can be provided on the surface contacting the liquid crystal layer, of the transparent substrate. In the case of using a transparent substrate having an alignment film, the electrode may be provided between the substrate and the alignment film.

No particular limitation is imposed on the liquid crystalline material forming the liquid crystal layer. Therefore, there may be used conventional various low molecular weight- and polymeric liquid crystalline substances and mixtures thereof. The liquid crystalline material may be blended with a dye, a chiral dopant, and a non-liquid crystalline substance to an extent that the liquid crystallinity is not adversely affected.

In addition to the electrode substrates and the liquid crystal layer, the liquid crystal cell may be provided with various components which are necessary to obtain various modes of liquid crystal cells described hereinbelow.

Such liquid crystal cell modes are exemplified by TN (Twisted Nematic), STN(Super Twisted Nematic), ECB (Electrically Controlled Birefringence), IPS(In-Plane Switching), VA(Vertical Alignment), OCB(Optically Compensated Birefringence), HAN(Hybrid Aligned Nematic), and ASM(Axially Symmetric Aligned Microcell) modes, Half Tone Gray Scale mode, Domain Dividing mode, and display modes using a ferrodielectric liquid crystal and an antiferrodielectric liquid crystal.

No particular limitation is imposed on the driving mode of the liquid crystal cell. Therefore, it may be a passive matrix mode used in an STN-LCD, an active matrix mode using active electrodes such as TFT (Thin Film Transistor) electrodes and TFD (Thin Film Diode) electrodes, and a plasma address mode.

No particular limitation is imposed on the optical retardation compensator used in the liquid crystal display as long as it has excellent transparency and uniformity. There may be preferably used polymeric stretched films and optical compensation films formed from liquid crystal. Examples of the polymeric stretched films are uniaxial or biaxial optical retardation films formed with cellulose-, polycarbonate-, polyallylate-, polysulfone-, polyacryl, polyethersulfone-, or cyclic olefin-based polymers. Among these, polycarbonate-based polymers are preferred in terms of cost and film uniformity.

No particular limitation is imposed on the optical compensation film as long as it is a film which can utilize an optical anisotropy generating from a state wherein a liquid crystal is aligned. For example, there may be used various conventional optically functional films using nematic or discotic liquid crystal or smectic liquid crystal.

One or more of the optical retardation compensators exemplified herein may be used in the liquid crystal display. A polymeric stretched film and an liquid crystal optical compensation film may be used together.

No particular limitation is imposed on the reflection layer used in the liquid crystal display. Therefore, the reflection layer may be a metal such as aluminum, silver, gold, chromium, and platinum, an oxide such as magnesium oxide, a laminate of films of dielectrics, a liquid crystal film exhibiting a selective reflectivity, and combinations thereof. These reflection layers may be flat or curved and may be those provided with diffusive reflectivity by forming rugged patterns on its surface, those having a function as the electrode on the electrode substrate located on the side opposite to the viewing side, transflectors which are made thin or provided with holes so as to transmit a part of light, or any combination thereof.

No particular limitation is imposed on the light diffusing layer used in the liquid crystal display as long as it has properties to diffuse an incident light isotropically or anisotropically. For example, there may be used those comprising two or more regions and having a refractive index difference therebetween or those having on their surfaces rugged patterns. Examples of the light diffusing layer comprising two or more regions and having a refractive index difference therebetween are those wherein particles having a different refractive index from those of matrixes are dispersed therein. The light diffusing layer itself may have adhesive properties.

Although not restricted, the thickness of the light diffusing layer is usually 10 $\mu$m or more and preferably 500 $\mu$m or less. The total light transmittance of the light diffusing layer is preferably 50 percent or more and particularly preferably 70 percent or more. The haze value of the layer is usually 10 to 95 percent, preferably 40 to 90 percent, and more preferably 60 to 90 percent.

No particular limitation is imposed on the back light, front light, light-controlled film, light guide plate, and prism sheet used for the liquid crystal display. Therefore, they may be conventional ones.

In addition to the above-described components, the liquid crystal display of the present invention may be provided with another additional components. For example, the use of a color filter makes it possible to produce a color liquid crystal display which can provide multi- or full-colored images with increased color purity.

Particularly preferably, the liquid crystal display of the present invention comprises a liquid crystal cell formed by sandwiching a liquid crystal layer between a pair of transparent substrates each provided with an electrode, a polarizer disposed on the viewer's side of the cell, at least one optical retardation compensator disposed between the polarizer and the cell, and a transflector disposed in the rear viewing from the observer, of the liquid crystal layer wherein the aforementioned circular polarizer is provided in the rear viewing from the observer, of the transflector.

This type of liquid crystal display can operates both in reflection and transmission modes by arranging a back light on the rear of the circular polarizer. For example, in the case of using an STN-LCD mode liquid crystal cell, the resulting liquid crystal display is preferably provided with two sheets of the above-described polymeric stretched film as the optical retardation compensator and/or one sheet of the optical compensation film formed by the above-described liquid crystal because excellent images can be obtained.

The optical compensation film is particularly preferably one wherein a twisted nematic alignment structure is fixed. The retardation and twisted angle of this optical compensation film depend on those of the liquid crystal cell and thus can not be determined with certainty. However, the retardation and twisted angle is preferably in the combination that the former is 400 nm or more and 1,200 nm or less and the latter is 150 degrees or larger and 220 degrees or smaller, more preferably in combination that the former is 500 nm or more and 1,000 nm or less and the latter is 160 degrees or larger and 210 degrees or smaller, further more preferably in combination that the former is 600 nm or more and 850 nm or less and the latter is 170 degrees or larger and 200 degrees or smaller. The twist direction of the optical compensation film is preferably opposite to that of the liquid crystal cell. In the liquid crystal display, excellent imaging properties can be obtained by providing the diffusing layer between the polarizer and the liquid crystal cell or using a diffusion reflective transflector as the electrode of the liquid crystal cell.

Modification of the liquid crystal display of the present invention is exemplified by reflective or transflective type liquid crystal displays using a TN-LCD mode liquid crystal cell. The twisted angle of the TN-LCD mode liquid crystal cell is usually 30 degrees or larger and 85 degrees or smaller, preferably 45 degrees or larger and 80 degrees or smaller, and more preferably 55 degrees or larger and 70 degrees or smaller because excellent imaging properties can be obtained in the combination with the circular polarizer of the present invention.

Applicability in the Industry

The circular polarizer of the present invention is characterized in that it is excellent in circular polarization properties and can provide a bright image of high contrast with less dependence on the viewing angle. Furthermore, since the thickness of the circular polarizer of the present invention can be reduced, a liquid crystal display can be produced with reduced thickness.

The present invention will be further described with reference to the following reference, inventive, and comparative examples but is not limited thereto. The retardations ($\Delta nd$) in the examples are values at a wavelength of 550 nm, unless stated otherwise.

Reference Example 1

Among optical retardation plates (twisted optical retardation plates) with twisted structures each having a twisted angle and a retardation as parameters, plates having such parameters that they can function as a circular polarizer in combination with a polarizer were sought. Since in a laminate composed of a polarizer, a twisted optical retardation plate, and a mirror, the rotation direction of a circularly polarized light is reversed when it is reflected at the mirror surface, the reflectance of a light made incident perpendicularly on the mirror from the polarizer side is ideally zero. Using this principle, in a laminate comprised of a polarizer, a twisted optical retardation plate, and a mirror, the combinations of parameters such as the absorption axis direction of the polarizer and the twisted angle and retardation of the optical retardation plate are calculated with an extended Jones matrix method. Form the results of the calculation, the reflectance was evaluated with "Y" value which indicates luminance having been subjected to visual compensation so as to extract the combinations whose Y values are lowered (darkened) to the equal extent to which are obtained using a conventional non-twisted uniaxial $\lambda/4$ wavelength plate. As a result, it was found that excellent circular polarization properties can be obtained in the case where the retardation to a light at a wavelength of 550 nm, of the twisted optical retardation film is within the range of 140 nm or higher and 400 nm or lower and the twisted angle is within the range of 30 degrees or larger and 85 degrees or smaller. Furthermore, it was also found that particularly excellent circular polarization properties can be obtained with around 3 parameter groups in combination shown in Table 1 below.

TABLE 1

| Absorption axis direction of polarizer | Twisted angle | Retardation |
| --- | --- | --- |
| −15° or +75° | +45° | 165 nm |
| +15° or −75° | −45° | |
| 0 or 90° | ±64° | 196 nm |
| +15° or −75° | +75° | 250 nm |
| −15° or +75° | −75° | |

In this reference example, the optical axis of the side contacting with the polarizer, of the twisted optical retardation film is defined as "0 degree", the angle of anti-clockwise direction from the polarizer toward the mirror is defined as "+", and the angle of clockwise direction is defined as "−".

The value "Y" corresponds to the polarizability of circular polarization obtained with the circular polarizer of the present invention. Therefore, the upper limit of the value "Y" depends on the usage or purpose of the circular polarizer of the present invention and thus can not be determined with certainty. However, the parameter groups are preferably within the range shown in Table 2 below and more preferably within the range shown in Table 3 below. The parameter groups in excess of these ranges would fail to obtain sufficient circular polarization properties.

Of course, in applications wherein such circular polarization properties are not strictly required, a circular polarizer having parameters outside the ranges shown in Tables 2 and 3 is also preferably used. In this case, the use of such a circular polarizer in a transflective liquid crystal display provided with a transflector can obtain imaging (displaying) effects wherein the brightness and hue in the transmission mode are highly regarded.

TABLE 2

| No. | Absorption axis direction of polarizer | Twisted angle | Retardation |
| --- | --- | --- | --- |
| #1 | −15° or +75° ±15°<br>+15° or −75° ±15° | +45° ±5°<br>−45° ±5° | 165 nm ± 10 nm |
| #2 | 0° or 90° ±15° | ±64° ±6° | 196 nm ± 20 nm |
| #3 | +15° or −75° ±15°<br>−15° or +75° ±15° | +75° ±5°<br>−75° ±5° | 250 nm ± 20 nm |

TABLE 3

| No. | Absorption axis direction of polarizer | Twisted angle | Retardation |
| --- | --- | --- | --- |
| #1 | −15° or +75° ±10°<br>+15° or −75° ±10° | +45° ±4°<br>−45° ±4° | 165 nm ± 5 nm |
| #2 | 0° or 90° ±10° | ±64° ±4° | 196 nm ± 10 nm |
| #3 | +15° or −75° ±10°<br>−15° or +75° ±10° | +75° ±4°<br>−75° ±4° | 250 nm ± 10 nm |

INVENTIVE EXAMPLE 1

A polymerization was conducted using 50 mmole of terephthalic acid, 50 mmole of 2,6-naphthalene dicarboxylic acid, 40 mmole of methyl hydroquinone diacetate, 60 mmole of catechol diacetate, and 60 mg of N-methylimidazole under a nitrogen atmosphere at a temperature of 270° C. for 12 hours. The resulting reaction product was dissolved in tetrachloroethane and then purified by reprecipitating with methanol thereby obtaining 14.7 g of a liquid crystalline polyester. It was found that this liquid crystalline polyester (Polymer 1) had an inherent viscosity of 0.17, a nematic liquid crystalline phase, an isotropic phase-liquid crystalline phase transition temperature of 250° C. or higher, and a glass transition temperature of 115° C.

90 mmol of biphenyldicarbonylchloride, 10 mmol of terephthaloylchloride, 105 mmol of S-2-methyl-1,4-butanediol were reacted in dichloromethane at room temperature for 20 hours, and the reaction solution was put into methanol to be reprecipitated thereby obtaining 12.0 g of a liquid crystalline polyester (Polymer 2). The inherent viscosity of Polymer 2 was 0.12.

A solution was prepared by dissolving 19.82 g of Polymer 1 and 0.18 g of Polymer 2 in 80 g of a mixed solvent (6/4 weight ratio) of phenol/tetrachloroethane. The resulting solution was coated over a polyimde film (KAPTON manufactured by Dupont Co) which had been rubbing-treated with a rayon cloth by a bar-coat method and was dried to remove the solvent, followed by heat treatment at 210° C. for 20 minutes thereby forming a twisted nematic alignment structure. Thereafter, the product was cooled to below room temperature so as to fix the twisted nematic alignment structure in a glassy state thereby obtaining a liquid crystal film (Liquid Crystal Film 1) with a thickness of 1.0 μm uniformly oriented over the polyimide film. The film thickness was measured using a contact type film thickness meter.

Since Liquid Crystal Film 1 was formed on a polyimide film which is opaque and optically anisotropic, it can not be used as an optically anisotropic layer as it is. Therefore, a UV-setting adhesive (UV-3400 manufactured by Toagosei Co., Ltd.) with a thickness of about 5 μm was coated on the surface exposed to the air of Liquid Crystal Film 1, and thereonto was laminated a triacetyl cellulose film (FujiTAC T80SZ manufactured by Fuji Photo Film Co., Ltd.), which is an optically isotropic film, with a thickness of 80 μm, followed by a UV irradiation of about 600 mJ so as to cure the adhesive. Thereafter, the polyimde film was removed from the laminate of the triacetyl cellulose film/adhesive layer/liquid crystal film layer/polyimide film thereby transferring the liquid crystal film on the triacetyl cellulose film. Furthermore, a UV-setting adhesive (UV-3400, manufactured by Toagosei Co., Ltd.) with a thickness of about 5 μm was coated on the surface of the liquid crystal film from which surface the polyimide film had been removed and was irradiated with a UV light of about 600 mJ from a high-pressure mercury lump while insulating oxygen so as to cure the adhesive thereby forming an overcoat layer. The resulting laminate was hereinafter referred to as Optical Anisotropic Element 1. The Δnd and twisted angle of Optical Anisotropic Element 1 were measured by a rotating polarizer method and found to be 196 nm and 64 degrees, respectively.

A polarizer with a thickness of 180 μm (SQW-862 manufactured by Sumitomo Chemical Industry Co., Ltd.) was laminated via a pressure-sensitive adhesive with a thickness of about 25 μm over Optical Anisotropic Element 1 thereby obtaining Laminate 1 with a thickness of 296 μm. Laminate 1 was subjected to an ellipsometry using an ellipsometer (DVA-36VWLD manufactured by Mizojiri Optical Co., Ltd.) and was found to be 0.94 in ellipticity at a wavelength of 550 nm. It was therefore confirmed that Laminate 1 was a circular polarizer with excellent circular polarization properties.

INVENTIVE EXAMPLE 2

Similarly to Example 1, a uniformly oriented liquid crystal film (Liquid Crystal Film 2) with a thickness of 0.8 μm was obtained using 19.8 g of Polymer 1 and 0.2 g of Polymer 2.

Furthermore, Optically Anisotropic Element 2 of a triacetyl cellulose film/an adhesive layer/a liquid crystal film/an overcoat layer was made by following the procedures of Example 1. The Δnd and twisted angle of Optical Anisotropic Element 2 were measured by a rotating polarizer method and found to be 165 nm and 45 degrees, respectively.

Laminate 2 with a thickness of 296 μm was obtained by laminating a polarizer with a thickness of 180 μm (SQW-862 manufactured by Sumitomo Chemical Industry Co., Ltd.) and Optically Anisotropic Element 2 using a pressure-sensitive adhesive layer with a thickness of about 25 μm. The ellipsometry of Laminate 2 was conducted using an ellipsometer and was found to be 0.93 in ellipticity at a wavelength of 550 nm. It was therefore confirmed that Laminate 2 was a circular polarizer with excellent circular polarization properties.

INVENTIVE EXAMPLE 3

Similarly to Example 1, a uniformly oriented liquid crystal film (Liquid Crystal Film 3) with a thickness of 1.25 μm was obtained using 19.82 g of Polymer 1 and 0.18 g of Polymer 2.

Furthermore, Optically Anisotropic Element 3 of a triacetyl cellulose film/an adhesive layer/a liquid crystal film layer/an overcoat layer was made by following the procedures of Example 1. The Δnd and twisted angle of Optical Anisotropic Element 3 were measured by a rotating polarizer method and found to be 250 nm and 75 degrees, respectively.

Laminate 3 with a thickness of 296 μm was obtained by laminating a polarizer with a thickness of 180 μm (SQW-862 manufactured by Sumitomo Chemical Industry Co., Ltd.) and Optically Anisotropic Element 3 using a pressure-sensitive adhesive layer with a thickness of about 25 μm. The ellipsometry of Laminate 3 was conducted using an ellipsometer and was found to be 0.93 in ellipticity at a wavelength of 550 nm. It was therefore confirmed that Laminate 2 was a circular polarizer with excellent circular polarization properties.

INVENTIVE EXAMPLE 4

151.3 g (518 mmol) of 4-(6-acryloyloxyhexyloxy) benzoic acid, 1.5 g of 2,6-di-tert-butyl-4-methylphenol, 70.1 g (543 mmol) of disopropylethylamine, and 62.1 g (543 mmol) of methanesulfonylchloride were reacted in a distillated tetrahydrofuran so as to synthesize the methane sulfonic acid anhydride of the carboxylic acid. The resulting anhydride was subjected to an esterification reaction with 29.87 g (246 mmol) of methylhydroquinone thereby obtaining a crude reaction product which was methylhydroquinone bis(4-(6-acryloyloxyhexyloxy)benzoic acid)ester (Compound 1). The crude reaction product was recrystallized with ethyl acetate/methanol thereby obtaining 146.9 g of white crystalline methylhydroquinone bis(4-(6-acryloyloxyhexyloxy)benzoic acid)ester. The purity of Compound 1 was measured using a GPC (gas permeation chromatography) analysis and found to be 98.7 percent. The GPC analysis was conducted using tetrahydrofuran as an eluent solvent and a Tosoh GPC analyzing apparatus CCP & 8000 (CP-8000, CO-8000, UV-8000) equipped with a filling column for high-speed GPC TSK gel G-1000HXL.

The observation of Compound 1 was conducted using a Metler hot stage and a polarizing microscope and indicated that Compound 1 was in a liquid crystalline phase at room temperature, transferred to a nematic phase at around 85° C., and assumed an isotropic phase by further heating to around 115° C.

2,3-dimethylhydroquinone bis(4-(11-acryloyloxyundecyloxy)benzoic acid)ester (Compound 2) was obtained using the same techniques as described above. The purity of Compound 2 measured by a GPC was 99.3 percent.

2-chlorohydroquinone bis((-)-(4-(2-ethylhexyl)benzoic acid))ester (Compound 3) was obtained using the same techniques as described above. The measurement of Compound 3 with a polarimeter revealed that it had a right-handed spirality.

6.0 g of Compound 1, 2.7 g of Compound 2, and 0.3 g of Compound 3 were weighed out and dissolved in 81 g of methoxypropyl acetate. To the resulting solution was added 0.02 g of a fluorine-containing surfactant (S-383 manufactured by Asahi Glass Co., Ltd.), 0.3 g a photopolymerization initiator (Irugacure 907 manufactured by Ciba Speciallity Chemicals Co.), and 0.1 g of diethylthioxantone as a sensitizer. An alignment substrate was obtained by coating uniformly and then drying a polyvinyl alcohol (Kuraray Poval MP-203 manufactured by KURARAY Co., Ltd.) with a thickness of 0.2 μm via a gelatin layer over a triacetyl cellulose film (FujiTAC T80SZ manufactured by Fuji Photo Film Co., Ltd.), with a thickness of 80 μm, whose surface had been corona-treated and by rubbing the dried surface with a rayon cloth. The solution obtained above was then coated on the alignment substrate by a bar-coater. Thereafter, the substrate was dried at a temperature of 80° C. for 10 minutes. After the drying, it was founded that a twisted nematic alignment had already completed in the liquid crystal layer.

Thereafter, the substrate was placed in an oven set at a temperature of 50° C. and the interior of the oven was substituted with nitrogen until the oxygen concentration was 250 ppm or below for 2 or 3 minutes. At the same temperature, the substrate was irradiated with a UV light of about 1200 mJ from a high-pressure mercury lump so as to fix a twisted nematic alignment structure by reacting the acryl group thereby obtaining Optical Anisotropic Element 4. The Δnd and twisted angle of Optical Anisotropic Element 4 were measured by a rotating polarizer method and found to be 200 nm and 63 degrees, respectively.

Laminate 4 with a thickness of 286 μm was obtained by laminating a polarizer with a thickness of 180 μm (SQW-862 manufactured by Sumitomo Chemical Industry Co., Ltd.) and Optically Anisotropic Element 4 using a pressure-sensitive adhesive layer with a thickness of about 25 μm. The ellipsometry of Laminate 4 was conducted using an ellipsometer and was found to be 0.94 in ellipticity at a wavelength of 550 nm. It was therefore confirmed that Laminate 4 was a circular polarizer with excellent circular polarization properties.

INVENTIVE EXAMPLE 5

Laminate 5 was obtained by laminating an iodine-based polarizer with a thickness of 136 μm produced using a triacetyl cellulose film with a thickness of 58 μm and Optical Anisotropic Layer 1 used in Example 1 using a pressure-sensitive adhesive layer with a thickness of about 25 μm. The ellipsometry of Laminate 5 was conducted using an ellipsometer and was found to be 0.94 in ellipticity at a wavelength of 550 nm. It was therefore confirmed that Laminate 5 was a circular polarizer with excellent circular polarization properties. The thickness of the circular polarizer was 241 μm which is thinner than conventional ones.

INVENTIVE EXAMPLE 6

Onto the surface exposed to the air of Liquid Crystal Film 1 formed on a polyimide film used in Inventive Example 1 was coated a UV-setting adhesive (UV-3400 manufactured by Toagosei Co., Ltd.) with a thickness of about 5 μm. A polyethylene terephthalate film (T60 manufactured by Toray Industries, Inc), with a thickness of 50 μm was laminated over the adhesive and irradiated with a UV light of about 600 mJ so as to cure the adhesive. Thereafter, the polyimide film was removed from the laminate of the polyethylene terephthalate film/adhesive layer/liquid crystal film layer/polyimide film thereby transferring the liquid crystal film on the polyethylene terephthalate film. An UV-setting adhesive (UV-3400, manufactured by Toagosei Co., Ltd.) with a thickness of about 5 μm was coated on the surface of the liquid crystal film from which surface the polyimide film had been removed and was irradiated with a UV light of about 600 mJ from a high-pressure mercury lump while insulating oxygen so as to cure the adhesive thereby forming an overcoat layer and thus forming a laminate of the polyethylene terephthalate film/adhesive layer/liquid crystal film layer/overcoat layer.

A polarizer with a thickness of 180 μm (SQW-862 manufactured by Sumitomo Chemical Industry Co., Ltd.) was laminated via a pressure-sensitive adhesive with a thickness of about 25 μm on the overcoat layer of the laminate obtained above and the polyethylene terephthalate film was removed therefrom thereby obtaining Laminate 6 of the polarizer/pressure-sensitive adhesive layer/overcoat layer/liquid crystal film layer/adhesive layer. The ellipsometry of Laminate 6 was conducted using an ellipsometer and was found to be 0.94 in ellipticity at a wavelength of 550 nm. It was therefore confirmed that Laminate 6 was a circular polarizer with excellent circular polarization properties. The thickness of the circular polarizer was 216 μm which could be made extremely thinner than conventional ones.

INVENTIVE EXAMPLE 7

The procedures of Inventive Example 6 was followed except that the 180 μm thickness polarizer used therein was replaced with that having a thickness of 136 μm used in Inventive Example 5 thereby obtaining Laminate 7 of the polarizer/pressure-sensitive adhesive/overcoat layer/liquid crystal film layer/adhesive layer. The ellipsometry of Laminate 7 was conducted using an ellipsometer and was found to be 0.94 in ellipticity at a wavelength of 550 nm. It was therefore confirmed that Laminate 6 was a circular polarizer with excellent circular polarization properties. The thickness of the circular polarizer was 172 μm which could be made extremely thinner than conventional ones.

INVENTIVE EXAMPLE 8

Figure 1:
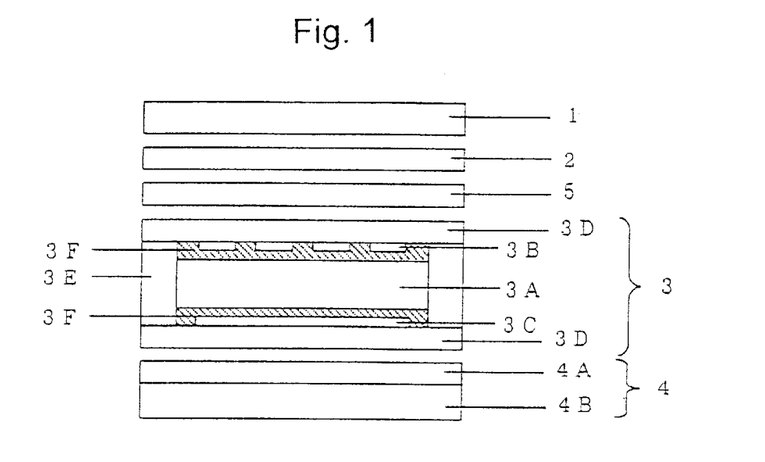
FIG. 1 is a schematic cross-sectional view showing the structure of the liquid crystal display produced in each of Inventive Examples 21 through 26.

A transflective STN liquid crystal display with the structure as shown in FIG. 1 was produced using the polarizer obtained in Inventive Example 1. In this example, the experiments were conducted using a liquid crystal cell wherein the counterclockwise direction from the polarizer 1 to the liquid crystal cell 3 was defined as "+", while the clockwise direction was defined as "−". However, the same results were obtained using a liquid crystal cell wherein the counterclockwise direction was defined as "−", while the clockwise direction was defined as "+".

As shown in FIG. 1, the liquid crystal cell 3 is provided with a pair of substrates 3D facing each other and disposed in superposed relation in the vertical direction, an upper electrode 3B formed on the lower surface of the upper substrate, a transflective electrode 3C formed on the upper surface of the lower substrate, and alignment film layers 3F printed on each electrode. A liquid crystal layer 3A was formed by injecting a liquid crystalline substance into a space defined by the alignment film layers 3F and an sealant layer 3E formed around the peripheral edges of the substrates by printing. ZLI-2293 manufactured by Merck Ltd. was used as the liquid crystalline material, and the liquid crystal layer was aligned in a predetermined direction by adjusting the alignment treatment direction of the alignment film layers 3F so as to be twisted at an angle θ1=+250 degrees. The product Δnd of the refractive index anisotropy Δn of the liquid crystalline substance in the liquid crystal cell 3 and the thickness d thereof was about 800 nm.

A polarizer with a thickness of 180 μm (SQW-862 manufactured by Sumitomo Chemical Industry Co., Ltd.) was disposed on the displaying surface (the upper portion in the figure) of the liquid crystal cell 3. Between the polarizer 1 and the liquid crystal cell 3 was inserted an optical retardation compensator 2 formed by a liquid crystal film wherein a twisted nematic alignment structure was fixed. This optical retardation compensator was produced in accordance with the procedures in Inventive Example 1. The optical retardation compensator 2 had a Δnd of about 670 nm and a twisted angle θ2 of −190 degrees. The angle θ3 formed by the absorption axis of the polarizer 1 and the aligned angle in the surface facing the polarizer of the optical retardation compensator 2 was set at +20 degrees, while the angle θ4 formed by the absorption axis of the polarizer 1 and the aligned angle in the surface facing the polarizer of the liquid crystal layer 3A was set at +105 degrees.

Furthermore, the circular polarizer 4 prepared in Example 1 was placed in the rear of the liquid crystal cell viewing from the observer. The circular polarizer 4 was composed of a polarizer 4B and an optically anisotropic element 4A wherein the Δnd and twisted angle θ6 were 196 nm and −64 degrees, respectively, formed by a liquid crystal film having a fixed twisted nematic alignment structure. The angle θ5 formed by the absorption axis of the polarizer 1 and the aligned angle in the surface facing the liquid crystal cell, of the polarizer of the optically anisotropic element 4A was set at +34 degrees, while the angle θ7 formed by the absorption axis of the polarizer 1 and the absorption axis of the polarizer 4B was set at +60 degrees.

Furthermore, between the optical retardation compensator 2 and the liquid crystal cell 3 was arranged a pressure-sensitive adhesive layer whose total ray transmittance and haze value were 90 percent and 80 percent, having photo-diffusion properties, while between the polarizer 1 and the optical retardation compensator 2 and between the liquid crystal cell 3 and the circular polarizer are arranged conventional transparent pressure-sensitive adhesive layers.

Figure 2:
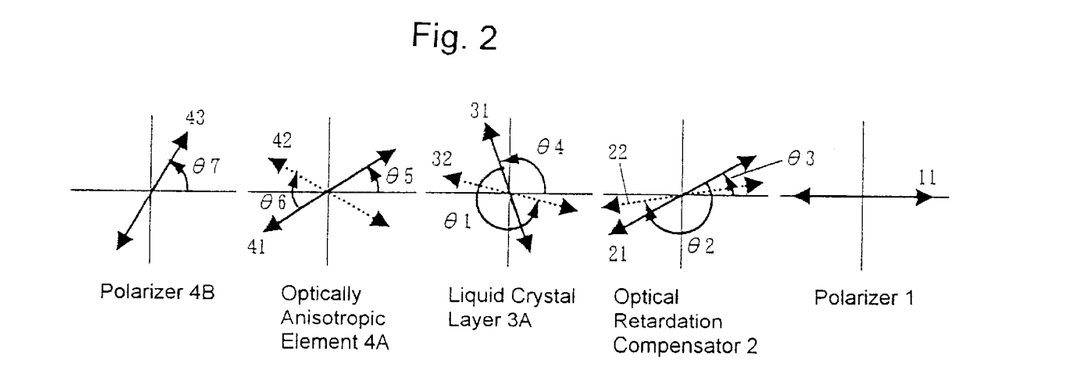
FIG. 2 is a plan view explaining the relationship of the angles of the axis of the polarizer and the axes of the liquid crystal cell, optical compensator, and circular polarizer constituting the liquid crystal display in each of Inventive Examples 8 through 14 and 21 through 26.

The relationship of the angles θ1 to θ7 in each of the components in the above-described transflective STN liquid crystal display are shown in FIG. 2.

In FIG. 2, the alignment direction 31 on the surface facing the polarizer 1 and alignment direction 32 on the surface facing the circular polarizer 4, of the liquid crystal layer 3A form an angle of θ1. The alignment axis direction 21 on the surface facing the polarizer 1 and alignment axis direction 22 on the surface facing the liquid crystal cell, of the optical retardation compensator 2 form an angle of θ2. The alignment axis direction 41 on the surface facing the polarizer 1 and alignment axis direction 42 on the surface facing the polarizer 4B, of the optically anisotropic element 4a form an angle of θ6. The absorption axis 11 of the polarizer 1 and the alignment axis direction 21 on the surface facing the polarizer 1, of the optical retardation compensator forms an angle of θ3, while the absorption axis 11 of the polarizer 1 and the alignment direction 31 on the surface facing the polarizer 1, of the liquid crystal layer 3A form an angle of θ4. The alignment direction 41 on the surface facing the liquid crystal cell, of the optically anisotropic element 4A and the absorption angle 11 of the polarizer 1 form an angle of θ5, while the absorption axis 43 of the polarizer 4B and the absorption angle 11 of the polarizer 1 form an angle of θ7.

A driving voltage (1/240 duty, driven at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was confirmed that the display could display a bright images of high contrast both in the reflection and transmission modes and had excellent viewing angle properties particularly in the transmission mode.

In this example, the experiment was conducted without using a color filter. However, needless to mention, the provision of a color filter in the liquid crystal cell results in excellent multi- or full color displaying. In this example, the excellent displaying can be achieved using two sheets of polycarbonate uniaxial and/or biaxial optical retardation films as the optical retardation compensation film.

INVENTIVE EXAMPLE 9

A liquid crystal display was produced by following the procedures of Inventive Example 8 except that the Δnd of each of the liquid crystal cell 3 and optical retardation compensator 2 was set to about 880 nm and 740 nm, respectively, and θ1=+240 degrees, θ2=−180 degrees, θ3=+15 degrees, θ4=+110 degrees, θ5=+30 degrees, θ6=−45 degrees, and θ7=+60 degrees.

A driving voltage (1/240 duty, driven at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was confirmed that the display could display a bright images of high contrast both in the reflection and transmission modes and had excellent viewing angle properties particularly in the transmission mode.

INVENTIVE EXAMPLE 10

A liquid crystal display was produced by following the procedures of Inventive Example 8 except that the Δnd of each of the liquid crystal cell 3 and optical retardation compensator 2 was set to about 840 nm and 710 nm, respectively, the polarizer of Inventive Example 3 was used, and θ1=+240 degrees, θ2=−180 degrees, θ3=+15 degrees, θ4=+110 degrees, θ5=+30 degrees, θ6=−75 degrees, and θ7=+60 degrees.

A driving voltage (1/240 duty, driven at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was confirmed that the display could display a bright images of high contrast both in the reflection and transmission modes and had excellent viewing angle properties particularly in the transmission mode.

INVENTIVE EXAMPLE 11

A liquid crystal display was produced by following the procedures of Inventive Example 8 except that the circular polarizer of Inventive Example 4 was used.

A driving voltage (1/240 duty, driven at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was confirmed that the display could display a bright images of high contrast both in the reflection and transmission modes and had excellent viewing angle properties particularly in the transmission mode.

INVENTIVE EXAMPLE 12

A liquid crystal display was produced by following the procedures of Inventive Example 8 except that the circular polarizer of Inventive Example 5 was used.

A driving voltage (1/240 duty, driven at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was confirmed that the display could display a bright images of high contrast both in the reflection and transmission modes and had excellent viewing angle properties particularly in the transmission mode. Since the circular polarizer was thin, the thickness of the liquid crystal display was reduced.

INVENTIVE EXAMPLE 13

A liquid crystal display was produced by following the procedures of Inventive Example 8 except that the circular polarizer of Inventive Example 6 was used.

A driving voltage (1/240 duty, driven at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was confirmed that the display could display a bright images of high contrast both in the reflection and transmission modes and had excellent viewing angle properties particularly in the transmission mode. Since the circular polarizer was thin, the thickness of the liquid crystal display was reduced.

INVENTIVE EXAMPLE 14

A liquid crystal display was produced by following the procedures of Inventive Example 8 except that the circular polarizer of Inventive Example 7 was used.

A driving voltage (1/240 duty, driven at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was confirmed that the display could display a bright images of high contrast both in the reflection and transmission modes and had excellent viewing angle properties particularly in the transmission mode. Since the circular polarizer was thin, the thickness of the liquid crystal display was reduced.

INVENTIVE EXAMPLE 15

A uniformly oriented liquid crystal film (Liquid Crystal Film 4) with a thickness of 1.85 $\mu$m was obtained using 19.93 g of Polymer 1 and 0.07 g of Polymer 2 by following the procedures of Inventive Example 1.

Furthermore, Optically Anisotropic Element 5 of a tri-acetyl cellulose film/an adhesive layer/a liquid crystal film layer/an overcoat layer was made by following the procedures of Example 1. The $\Delta$nd and twisted angle of Optical Anisotropic Element 5 were measured by a rotating polarizer method and found to be 370 nm and 45 degrees, respectively.

Laminate 8 with a thickness of 297 $\mu$m was obtained by laminating a polarizer with a thickness of 180 $\mu$m (SR1862AP manufactured by Sumitomo Chemical Industry Co., Ltd.) and Optically Anisotropic Element 5 using a pressure-sensitive adhesive layer with a thickness of about 25 $\mu$m. The ellipsometry of Laminate 8 was conducted using an ellipsometer and was found to be 0.90 in ellipticity at a wavelength of 550 nm.

INVENTIVE EXAMPLE 16

A uniformly oriented liquid crystal film (Liquid Crystal Film 5) with a thickness of 1.4 $\mu$m was obtained using 19.88 g of Polymer 1 and 0.12 g of Polymer 2 by following the procedures of Inventive Example 1.

Furthermore, Optically Anisotropic Element 6 of a tri-acetyl cellulose film/an adhesive layer/a liquid crystal film layer/an overcoat layer was made by following the procedures of Example 1. The $\Delta$nd and twisted angle of Optical Anisotropic Element 6 were measured by a rotating polarizer method and found to be 280 nm and 60 degrees, respectively.

Laminate 9 with a thickness of 296 $\mu$m was obtained by laminating a polarizer with a thickness of 180 $\mu$m (SR1862AP manufactured by Sumitomo Chemical Industry Co., Ltd.) and Optically Anisotropic Element 6 using a pressure-sensitive adhesive layer with a thickness of about 25 $\mu$m. The ellipsometry of Laminate 9 was conducted using an ellipsometer and was found to be 0.81 in ellipticity at a wavelength of 550 nm.

INVENTIVE EXAMPLE 17

A uniformly oriented liquid crystal film (Liquid Crystal Film 6) with a thickness of 1.7 $\mu$m was obtained using 19.90 g of Polymer 1 and 0.10 g of Polymer 2 by following the procedures of Inventive Example 1.

Furthermore, Optically Anisotropic Element 7 of a tri-acetyl cellulose film/an adhesive layer/a liquid crystal film layer/an overcoat layer was made by following the procedures of Example 1. The $\Delta$nd and twisted angle of Optically Anisotropic Element 7 were measured by a rotating polarizer method and found to be 340 nm and 60 degrees, respectively.

Laminate 10 with a thickness of 297 $\mu$m was obtained by laminating a polarizer with a thickness of 180 $\mu$m (SR1862AP manufactured by Sumitomo Chemical Industry Co., Ltd.) and Optically Anisotropic Element 7 using a pressure-sensitive adhesive layer with a thickness of about 25 $\mu$m. The ellipsometry of Laminate 10 was conducted using an ellipsometer and was found to be 0.94 in ellipticity at a wavelength of 550 nm.

INVENTIVE EXAMPLE 18

A uniformly oriented liquid crystal film (Liquid Crystal Film 7) with a thickness of 0.95 $\mu$m was obtained using 19.78 g of Polymer 1 and 0.22 g of Polymer 2 by following the procedures of Inventive Example 1.

Furthermore, Optically Anisotropic Element 8 of a tri-acetyl cellulose film/an adhesive layer/a liquid crystal film layer/an overcoat layer was made by following the procedures of Example 1. The $\Delta$nd and twisted angle of Optical Anisotropic Element 8 were measured by a rotating polarizer method and found to be 190 nm and 75 degrees, respectively.

Laminate 11 with a thickness of 296 $\mu$m was obtained by laminating a polarizer with a thickness of 180 $\mu$m (SR1862AP manufactured by Sumitomo Chemical Industry Co., Ltd.) and Optically Anisotropic Element 8 using a pressure-sensitive adhesive layer with a thickness of about 25 $\mu$m. The ellipsometry of Laminate 11 was conducted using an ellipsometer and was found to be 0.86 in ellipticity at a wavelength of 550 nm.

INVENTIVE EXAMPLE 19

A uniformly oriented liquid crystal film (Liquid Crystal Film 8) with a thickness of 1.6 $\mu$m was obtained using 19.87 g of Polymer 1 and 0.13 g of Polymer 2 by following the procedures of Inventive Example 1.

Furthermore, Optically Anisotropic Element 9 of a triacetyl cellulose film/an adhesive layer/a liquid crystal film layer/an overcoat layer was made by following the procedures of Example 1. The Δnd and twisted angle of Optical Anisotropic Element 9 were measured by a rotating polarizer method and found to be 320 nm and 75 degrees, respectively.

Laminate 12 with a thickness of 297 μm was obtained by laminating a polarizer with a thickness of 180 μm (SR1862AP manufactured by Sumitomo Chemical Industry Co., Ltd.) and Optically Anisotropic Element 9 using a pressure-sensitive adhesive layer with a thickness of about 25 μm. The ellipsometry of Laminate 12 was conducted using an ellipsometer and was found to be 0.84 in ellipticity at a wavelength of 550 nm.

INVENTIVE EXAMPLE 20

A uniformly oriented liquid crystal film (Liquid Crystal Film 9) with a thickness of 1.1 μm was obtained using 19.85 g of Polymer 1 and 0.15 g of Polymer 2 by following the procedures of Inventive Example 1.

Furthermore, Optically Anisotropic Element 10 of a triacetyl cellulose film/an adhesive layer/a liquid crystal film layer/an overcoat layer was made by following the procedures of Example 1. The Δnd and twisted angle of Optical Anisotropic Element 10 were measured by a rotating polarizer method and found to be 220 nm and 60 degrees, respectively.

Laminate 13 with a thickness of 296 μm was obtained by laminating a polarizer with a thickness of 180 μm (SR1862AP manufactured by Sumitomo Chemical Industry Co., Ltd.) and Optically Anisotropic Element 10 using a pressure-sensitive adhesive layer with a thickness of about 25 μm. The ellipsometry of Laminate 13 was conducted using an ellipsometer and was found to be 0.78 in ellipticity at a wavelength of 550 nm.

INVENTIVE EXAMPLE 21

A liquid crystal display was produced by following the procedures of Inventive Example 8 except that the Δnd of each of the liquid crystal cell 3 and optical retardation compensator 2 was set to about 850 nm and 690 nm, respectively, the polarizer of Inventive Example 15 was used, and $\theta1=+250$ degrees, $\theta2=-190$ degrees, $\theta3=+15$ degrees, $\theta4=+100$ degrees, $\theta5=-20$ degrees, $\theta6=-45$ degrees, and $\theta7=+50$ degrees.

A driving voltage (1/240 duty, driven at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was confirmed that the display could display a bright image of high contrast both in the reflection and transmission modes and had excellent brightness and hue particularly in the transmission mode.

INVENTIVE EXAMPLE 22

A liquid crystal display was produced by following the procedures of Inventive Example 8 except that the Δnd of each of the liquid crystal cell 3 and optical retardation compensator 2 was set to about 850 nm and 690 nm, respectively, the polarizer of Inventive Example 16 was used, and $\theta1=+250$ degrees, $\theta2=-190$ degrees, $\theta3=+15$ degrees, $\theta4=+100$ degrees, $\theta5=-5$ degrees, $\theta6=-60$ degrees, and $\theta7=+40$ degrees.

A driving voltage (1/240 duty, driven at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was confirmed that the display could display a bright image of high contrast both in the reflection and transmission modes and had excellent brightness and hue particularly in the transmission mode.

INVENTIVE EXAMPLE 23

A liquid crystal display was produced by following the procedures of Inventive Example 8 except that the Δnd of each of the liquid crystal cell 3 and optical retardation compensator 2 was set to about 850 nm and 690 nm, respectively, the polarizer of Inventive Example 17 was used, and $\theta1=+250$ degrees, $\theta2=-190$ degrees, $\theta3=+15$ degrees, $\theta4=+100$ degrees, $\theta5=+5$ degrees, $\theta6=-60$ degrees, and $\theta7=+65$ degrees.

A driving voltage (1/240 duty, driven at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was confirmed that the display could display a bright image of high contrast both in the reflection and transmission modes and had excellent brightness and hue particularly in the transmission mode.

INVENTIVE EXAMPLE 24

A liquid crystal display was produced by following the procedures of Inventive Example 8 except that the Δnd of each of the liquid crystal cell 3 and optical retardation compensator 2 was set to about 850 nm and 690 nm, respectively, the polarizer of Inventive Example 18 was used, and $\theta1=+250$ degrees, $\theta2=-190$ degrees, $\theta3=+15$ degrees, $\theta4=+100$ degrees, $\theta5=+50$ degrees, $\theta6=-75$ degrees, and $\theta7=+70$ degrees.

A driving voltage (1/240 duty, driven at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was confirmed that the display could display a bright image of high contrast both in the reflection and transmission modes and had excellent brightness and hue particularly in the transmission mode.

INVENTIVE EXAMPLE 25

A liquid crystal display was produced by following the procedures of Inventive Example 8 except that the Δnd of each of the liquid crystal cell 3 and optical retardation compensator 2 was set to about 850 nm and 690 nm, respectively, the polarizer of Inventive Example 19 was used, and $\theta1=+250$ degrees, $\theta2=-190$ degrees, $\theta3=+15$ degrees, $\theta4=+100$ degrees, $\theta5=0$ degrees, $\theta6=-75$ degrees, and $\theta7=+40$ degrees.

A driving voltage (1/240 duty, driven at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was confirmed that the display could display a bright image of high contrast both in the reflection and transmission modes and had excellent brightness and hue particularly in the transmission mode.

INVENTIVE EXAMPLE 26

A liquid crystal display was produced by following the procedures of Inventive Example 8 except that the $\Delta$nd of each of the liquid crystal cell 3 and optical retardation compensator 2 was set to about 850 nm and 690 nm, respectively, the polarizer of Inventive Example 20 was used, and $\theta 1=+250$ degrees, $\theta 2=-190$ degrees, $\theta 3=+15$ degrees, $\theta 4=+100$ degrees, $\theta 5=+15$ degrees, $\theta 6=-60$ degrees, and $\theta 7=+50$ degrees.

A driving voltage (1/240 duty, driven at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was confirmed that the display could display a bright image of high contrast both in the reflection and transmission modes and had excellent brightness and hue particularly in the transmission mode.

Comparative Example 1

A liquid crystal display was produced by following the procedures of Inventive Example 8 except that a polycarbonate uniaxial optical retardation film ($\Delta$nd=137.5 nm) with a thickness of 70 $\mu$m was used as the optically anisotropic element of the circular polarizer 4. The angle $\theta 5$ of the uniaxial optical retardation and the polarizer 1 was set at 15 degrees corresponding to $\theta 6=0$ degree, while the angle $\theta 7$ formed by the absorption axes of the polarizer 1 and the polarizer 4B was set at +60 degrees.

A driving voltage (1/240 duty, drive at the optimized bias) was applied from a driving circuit (not shown) to the electrodes 3B, 3C of the liquid crystal display, and a back light was placed so as to examine the optical characteristics at the time the light is off (reflection mode) and on (transmission mode), respectively. It was found that the contrast was somewhat low and the viewing angle properties were narrow. The liquid crystal display was thicker than those of Inventive Examples 12, 13, and 14.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A circular polarizer comprising at least a polarizer and an optical anisotropic element wherein the optical anisotropic element contains a liquid crystal film in which a twisted nematic alignment structure is fixed and the combination of the product of the birefringence $\Delta$n at a wavelength of 550 nm and thickness d (nm) of said liquid crystal film and the twisted angle thereof is set to satisfy any of the following conditions:

(1) 155 nm or greater and 175 nm or less and 40 degrees or larger and 50 degrees or smaller;
   (2) 176 nm or greater and 216 nm or less and 58 degrees or larger and 70 degrees or smaller; and
   (3) 230 nm or greater and 270 nm or less and 70 degrees or larger and 80 degrees or smaller.

2. The circular polarizer according to claim 1 wherein said liquid crystal film is one obtained by aligning a liquid crystalline material in a liquid crystalline state so as to assume a twisted nematic phase and cooling the material as it is so as to fix the twisted nematic orientation in a glassy state.

3. The circular polarizer according to claim 1 wherein said liquid crystal film is one obtained by aligning a liquid crystalline material in a liquid crystalline state so as to assume a twisted nematic phase and photo- or thermal-crosslinking the material so as to fixe the twisted nematic orientation.

4. The circular polarizer according to claim 1 which has at least a polarizer and an optical anisotropic element laminated one after another and a thickness of 300 $\mu$m or less.

5. A liquid crystal display has the circular polarizer as defined in claim 1.

6. A transflective liquid crystal display which comprises at least a liquid crystal cell formed by sandwiching a liquid crystal layer between a pair of transparent substrates each provided with an electrode, a polarizer disposed on the viewer's side of said cell, at least one optical retardation compensator disposed between said polarizer and said cell, and a transflector disposed in the rear viewing from the observer, of said liquid crystal layer wherein the circular polarizer as defined in claim 1 is provided in the rear viewing from the observer, of said transflector.

* * * * *

UNITED STATES PATENT AND TRADEMARK OFFICE
CERTIFICATE OF CORRECTION

PATENT NO.    : 6,628,369 B2
DATED         : September 30, 2003
INVENTOR(S)   : Yoshihiro Kumagai et al.

It is certified that error appears in the above-identified patent and that said Letters Patent is hereby corrected as shown below:

<u>Title page,</u>
Item [63], Related U.S. Application Data, should read as follows: -- Continuation of application No. PCT/JP01/03925, filed on May 11, 2001 --.
Item [30], 1st priority application, should read as follows:
-- October 3, 2000  (JP) 2000-303451 --.

<u>Column 1,</u>
Line 7, "filed Nov. 5, 2001" should read -- filed May 11, 2001 --.

Signed and Sealed this

Twenty-seventh Day of January, 2004

JON W. DUDAS
*Acting Director of the United States Patent and Trademark Office*